(12) United States Patent
Monteux et al.

(10) Patent No.: US 12,211,141 B2
(45) Date of Patent: Jan. 28, 2025

(54) METHOD FOR CALCULATING THE VISIBILITY OF OBJECTS WITHIN A 3D SCENE

(71) Applicant: GADSME, Paris (FR)

(72) Inventors: Guillaume Monteux, Paris (FR); Luc Vauvillier, Vanves (FR)

(73) Assignee: GADSME, Paris (FR)

( * ) Notice: Subject to any disclaimer, the term of this patent is extended or adjusted under 35 U.S.C. 154(b) by 193 days.

(21) Appl. No.: 18/005,741

(22) PCT Filed: Jul. 13, 2021

(86) PCT No.: PCT/EP2021/069507
§ 371 (c)(1),
(2) Date: Jan. 30, 2023

(87) PCT Pub. No.: WO2022/013242
PCT Pub. Date: Jan. 20, 2022

(65) Prior Publication Data
US 2023/0281917 A1  Sep. 7, 2023

(30) Foreign Application Priority Data

Jul. 17, 2020  (FR) ..................... 2007515

(51) Int. Cl.
*G06T 15/40* (2011.01)
*G06T 7/00* (2017.01)
*G06T 15/00* (2011.01)
*G06T 15/50* (2011.01)

(52) U.S. Cl.
CPC ............ *G06T 15/40* (2013.01); *G06T 7/0002* (2013.01); *G06T 15/005* (2013.01); *G06T 15/506* (2013.01); *G06T 2207/10024* (2013.01); *G06T 2210/62* (2013.01)

(58) Field of Classification Search
None
See application file for complete search history.

(56) References Cited

U.S. PATENT DOCUMENTS

| | | | | |
|---|---|---|---|---|
| 6,646,639 B1 * | 11/2003 | Greene | ................. | G06T 15/005 345/422 |
| 7,483,042 B1 * | 1/2009 | Glen | ........................ | G09G 5/10 345/506 |
| 11,132,831 B1 * | 9/2021 | Schmalstieg | ............ | G06T 15/20 |
| 2004/0169671 A1 * | 9/2004 | Aronson | ............... | G06T 15/005 715/700 |
| 2011/0141112 A1 * | 6/2011 | Hux | ....................... | G06T 15/005 345/545 |

(Continued)

OTHER PUBLICATIONS

International Search Report as issued in International Patent Application No. PCT/EP2021/069507, dated Oct. 27, 2021.

(Continued)

*Primary Examiner* — David H Chu
(74) *Attorney, Agent, or Firm* — Pillsbury Winthrop Shaw Pittman LLP

(57) ABSTRACT

A dedicated camera, clone of the main camera, is used with a graphics pipeline configured so as to generate an image enabling a simple measurement of the visibility of an object. The image thus generated takes account of all the parameters capable of altering the visibility of the object.

5 Claims, 4 Drawing Sheets

(56) References Cited

U.S. PATENT DOCUMENTS

2015/0062142 A1\* 3/2015 Goel .................... G06T 11/203
　　　　　　　　　　　　　　　　　　　　　345/582
2017/0161863 A1\* 6/2017 Baral .................... G06T 15/80
2023/0196627 A1\* 6/2023 Seiler ..................... G06T 9/20
　　　　　　　　　　　　　　　　　　　　　345/506

OTHER PUBLICATIONS

Brüll, F., "Order-Independent Transparency Acceleration," Bachelor thesis, Sep. 2018, Retrieved from the Internet: URL:https://www2.in.tu-clausthal.de/-cgstore/theses/ha_ felix brüll_2018.pdf, XP055794949.

Anonymous: "Transparent Depth Shader (good for ghosts!)—Unity Forum," Aug. 2012, Retrieved from the Internet: URL:https://forum.unity.com/threads/transparent-depth-shader-good-for-ghosts.149511/, [Retrieved on Apr. 13, 2021], XP055794950.

\* cited by examiner

METHOD FOR CALCULATING THE VISIBILITY OF OBJECTS WITHIN A 3D SCENE

CROSS-REFERENCE TO RELATED APPLICATIONS

This application is the U.S. National Stage of PCT/EP2021/069507, filed Jul. 13, 2021, which in turn claims priority to French patent application number 2007515, filed Jul. 17, 2020. The content of these applications are incorporated herein by reference in their entireties.

TECHNICAL FIELD OF THE INVENTION

The object of the invention is a method for calculating the visibility of objects within a three-dimensional scene, also called a 3D scene.

The technical field of the invention is that of 3D (or 2D, for two dimensions) rendering and object visibility detection in applications using graphics renderers such as video games, virtual worlds, virtual reality, augmented reality, etc.

TECHNOLOGICAL BACKGROUND OF THE INVENTION

In the field of the art, graphics engines, such as Unity, Unreal and others, are used to produce images for displaying on a screen. These images are produced from a scene comprised of objects. From a macroscopic point of view, for an end user, these objects are buildings, vehicles, planets, everyday objects . . . . From the point of view of the graphics renderer, they are a list of geometric shapes with coordinates in space, surface properties, movement rules in time, etc.

More technically, the object of a 3D renderer is to draw in real time on a rendering plane called "viewport", a plurality of objects composing a scene. These objects are defined in the coordinate space (x,y,z).

For this, with reference to FIG. 1, an object 100 is projected onto a viewport 110 from the point of view of a camera 120, which is also defined in the coordinate space (x,y,z).

A renderer uses several techniques in order to correctly project and draw the scene onto the rendering plane. These techniques are combined in a "render pipeline" also called a graphics pipeline. The graphics pipeline includes a notion of visibility in order to calculate for each pixel which object has to be drawn and render its colour.

It is therefore easy to understand that from a given observation point certain objects are more or less visible, some of which may mask others.

In the rendering of a 3-dimensional scene, there is sometimes a need to know the visibility of an element within this scene. Indeed, it may be hidden by another, in a shadow zone, partially visible, or behind another semi-transparent object.

This need is currently met inaccurately or partially.

One solution is to use the so-called zbuffer technique. This technique makes it possible to determine the visibility of an object at the time it is drawn, as other elements may cover it later. This technique therefore only allows positioning and orientation of the object in relation to an observer, also known as a camera, to be taken into account when the object is rendered.

Another solution is the use of "raycasts". However, this solution does not allow the visibility of an object behind a semi-transparent object or an object in a shadow zone to be known.

Therefore, there is no solution allowing a calculation of the visibility behind transparent objects taking lighting of the scene and shadows into account.

SUMMARY OF THE INVENTION

Our invention meets this need by describing a very accurate technique for calculating the visibility of an object within a scene.

The invention relies on a second rendering in addition to the main rendering. The main rendering is that expected by the user of the application implementing the renderer.

For this, a second camera is added to the scene. This second camera follows the position and characteristics of the main camera at all times (position, scale, filter options, cut planes, etc.).

Unlike the main camera which is used to render the scene and display it to the player, the second camera performs a rendering only to verify the visibility of certain objects in the scene. The frequency of these renderings can be different from the main camera so as not to disrupt the performance of the application.

The graphics pipeline associated with this second camera is modified in order to be able to perform the visibility calculations according to the invention.

The invention provides a solution to the previously mentioned problems, by allowing all aspects of the scene to be taken into account.

One aspect of the invention relates to a method for calculating a visibility score within a three-dimensional scene, the scene being comprised of a plurality of objects, characterised in that the method includes the following steps implemented by a dedicated camera being a clone of a main camera, the dedicated camera being associated with a dedicated graphics pipeline:

Selecting a set of at least one object from the plurality of objects in the scene;
For each object in the set selected, clipping the object into zones to be tested;
Selecting a stencil buffer channel to record a visibility mask for the objects in the set selected, the visibility mask being produced by associating a custom shader with the objects in the set selected, said custom shader writing a predetermined value into the stencil buffer channel;
Using, via a hook of the dedicated pipeline, the contents of the channel of the stencil buffer to affect the image by making it opaque where the stencil buffer value is not the predetermined value and transparent elsewhere;
Rendering objects transparent;
For each object in the set selected:
Calculating a visibility score based on the alpha values of the centre points of the zones to be tested.

In addition to the characteristics just discussed in the previous paragraph, the method according to one aspect of the invention may have one or more of the following additional characteristics, considered individually or in any technically possible combination:

The predetermined value is different from a default value used by the dedicated pipeline;
For a given renderer, the dedicated pipeline is the least calculation-resource intensive pipeline;
The calculation frequency of the dedicated camera is lower than the calculation frequency of the main camera;
Lighting calculation steps are maintained in the dedicated pipeline to measure a colour deviance from an ambient lighting of the scene, said deviance being used to modify the visibility score.

The invention and its various applications will be better understood upon reading the following description and examining the accompanying figures.

BRIEF DESCRIPTION OF THE FIGURES

The figures are set forth for indicative and in no way limiting purposes of the invention.

DETAILED DESCRIPTION

In this description, the processing actions are performed by microprocessors that use memory. These microprocessors are either general purpose microprocessors also called CPUs or graphics microprocessors also called GPUs.

In practice, the invention is implemented by a computer, a game console, a smart phone and additionally any device capable of implementing a graphics renderer.

The figures are set forth for indicative and in no way limiting purposes of the invention.

Unless otherwise specified, a same element appearing in different figures has a unique reference.

Figure 1:
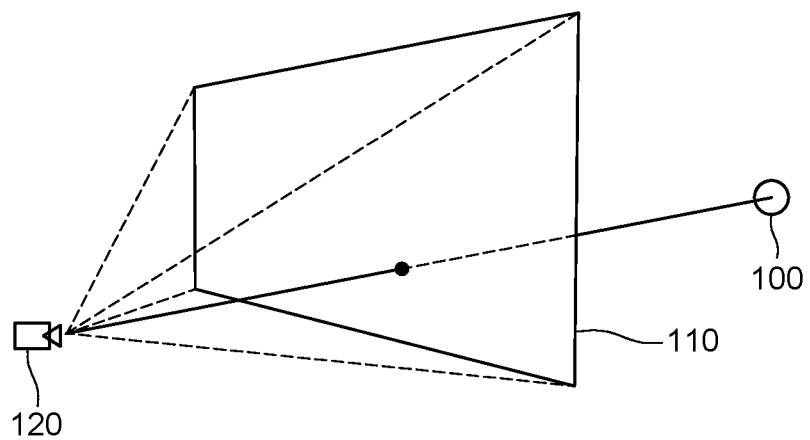
FIG. 1 shows a simplified illustration of the operation of a graphics renderer.
Figure 2:
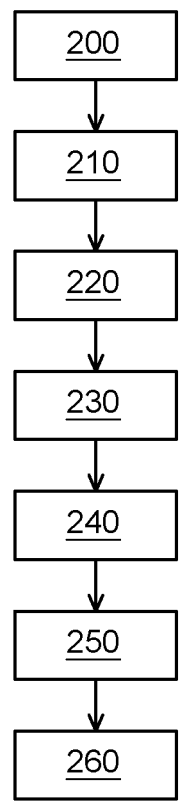
FIG. 2 shows an illustration of steps of the method according to the invention.

FIG. 2 shows a step 200 of declaring a dedicated camera. This camera is a clone of the main camera. Programming interfaces of the renderer are used to declare and instantiate this dedicated camera.

FIG. 2 shows a step 210 of selecting at least one object among a plurality of objects in the scene. It is reminded that a scene is comprised of a plurality of 3D objects, each object having an identifier. The selection step produces, in a memory zone of a device implementing the method according to the invention, a list of identifiers including at least one identifier.

FIG. 2 shows a step 220 of clipping the selected objects into zones to be tested.

FIG. 2 shows a step 230 in which a custom shader is associated with each selected object. This custom shader is configured to write a predetermined value into a channel of the stencil. This predetermined value is different from the default value written by the graphics pipeline associated with the dedicated camera. It is thus possible to keep a fingerprint of the rendering of the selected objects.

FIG. 2 shows a step 240 of using the stencil buffer. This step is implemented using hooks exposed by the graphics pipeline. The hook used in this step corresponds to the end of the processing of the opaque objects in the scene. In this step, the contents of the channel of the stencil buffer is used to affect the image. The image is made opaque where the stencil buffer value is not the predetermined value used in the custom shader and transparent elsewhere.

Figure 3:
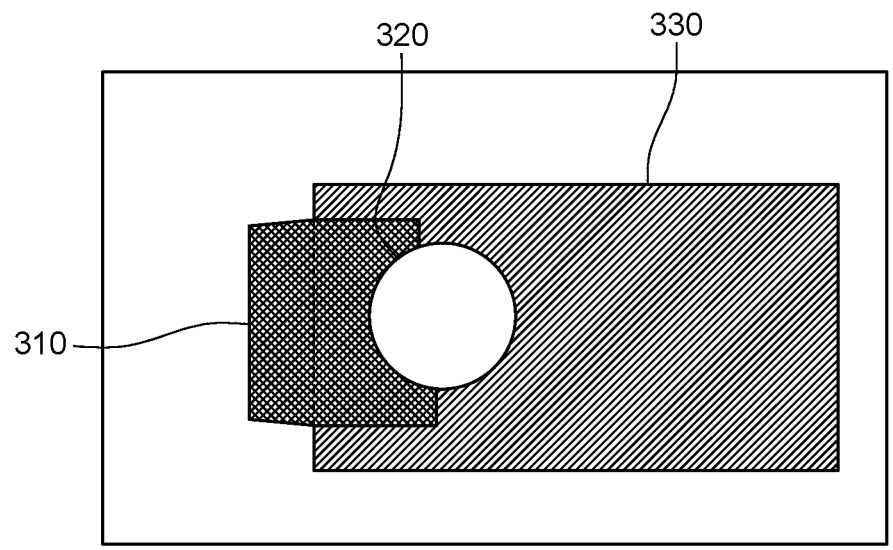
FIG. 3 shows an illustration of a scene rendered by the main camera.

FIG. 3 shows a rendering of a scene including 3 objects:

A first object 310 in the background. The first object is a selected object;

A second object 320 in the middle ground that partially covers the first object;

A third object 330 in the foreground, the third object:
Is transparent,
Covers the second object,
partially covers the first object.

Figure 4:
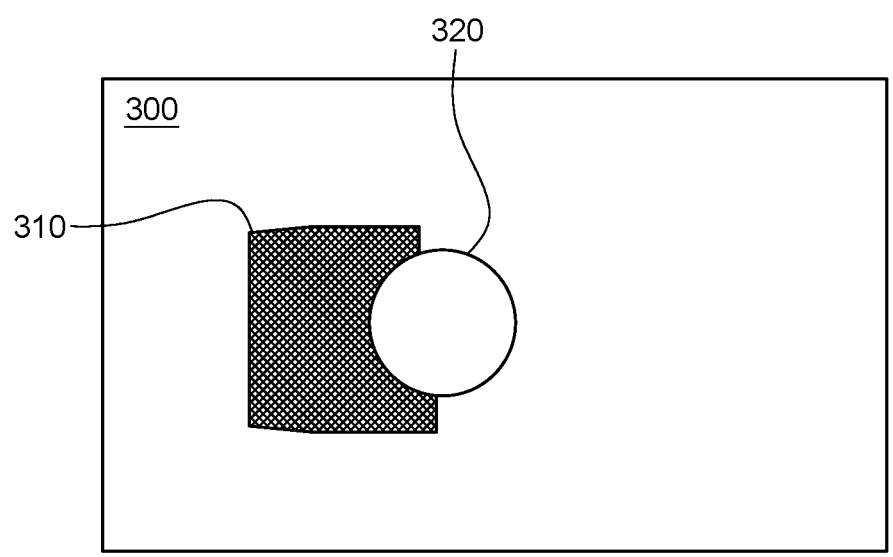
FIG. 4 shows an image at the end of the rendering of opaque objects by the dedicated pipeline.

FIG. 4 shows a viewport 300 of the secondary camera, in which opaque objects in a scene have been rendered.

Figure 5:
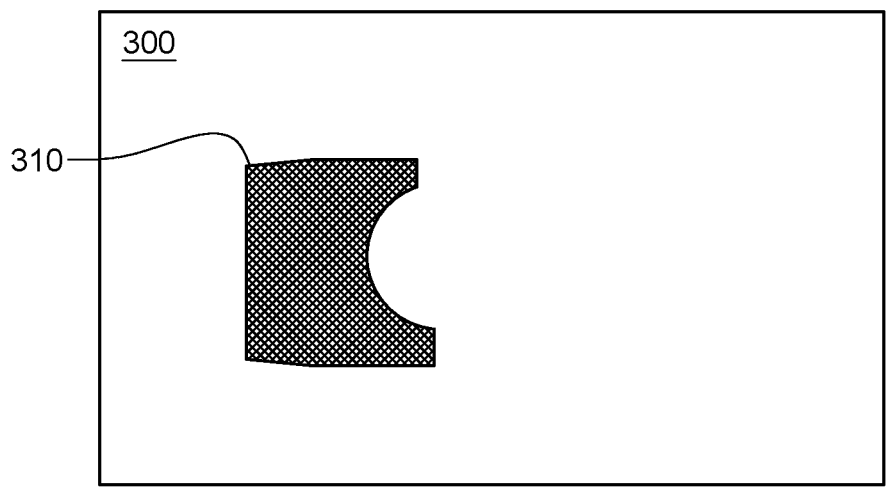
FIG. 5 shows a state of the stencil buffer corresponding to the end of the render of opaque objects.

FIG. 5 shows the state of the stencil buffer corresponding to [FIG. 4]. [FIG. 5] shows that the stencil buffer includes a footprint of the visible part of the first object in the scene.

Figure 6:
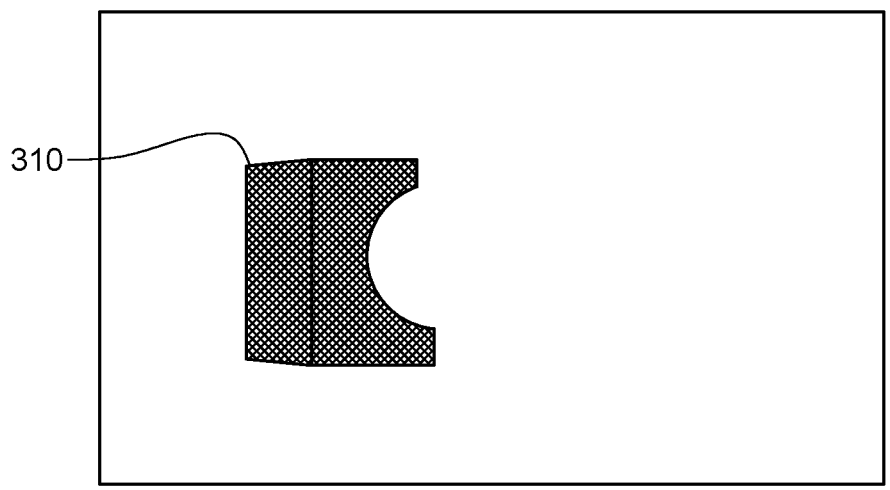
FIG. 6 shows the result of using the stencil buffer according to the invention.

FIG. 6 shows a step 250 of rendering transparent objects. [FIG. 6] shows the first object clipped by the second object and divided into two zones by the third object.

At the end of the transparent object rendering step 250, the dedicated pipeline has finished its rendering work and a rendered image is available.

FIG. 6 shows the state of the viewport of the dedicated camera after rendering the transparent objects.

FIG. 2 shows a step 260 of calculating the score. For an object, this calculation is performed as follows:

For each zone to be tested, the coordinates of the centre of the zone to be tested in the rendered image are determined;

For each centre calculated, the alpha value of the corresponding pixel is read and the following rule is used:
If alpha=0. The object is fully visible at this point;
If alpha=1. The object is not visible at this point;
If alpha is between 0 and 1, the object is partially visible at this point.

Figure 7:
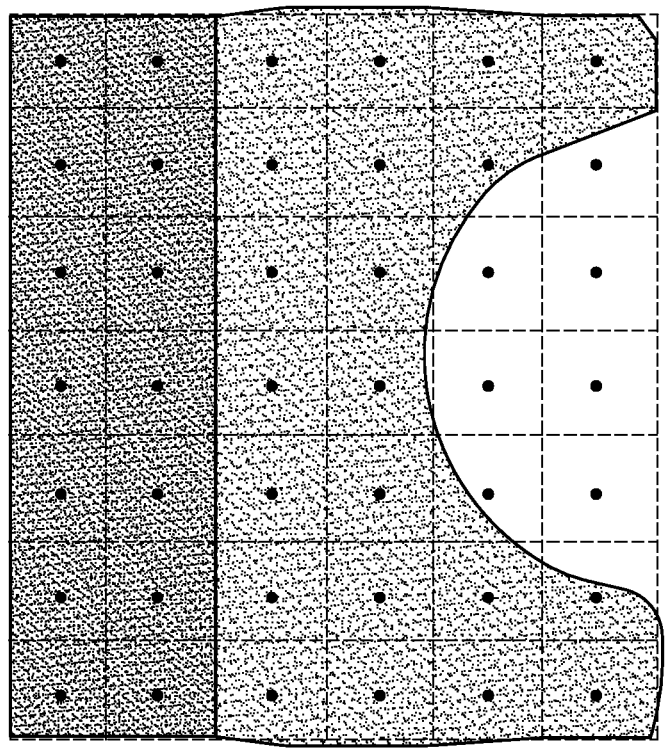
FIG. 7 shows zones to be tested in a selected object at the outlet of the dedicated pipeline.

In contrast to a standard Raycast, with the invention, each pixel tested has a value between 0 and 1. This is illustrated in [FIG. 7].

The visibility of the object can therefore be accurately determined by aggregating the alpha measurements. A simple sum is sufficient: if the sum is 0 then the object is fully visible. If the sum is the number of zones to be tested then the object is completely invisible.

It is also possible to use the rgb layers of the tested pixel to determine the colour deviation from the original colour. This allows the visibility score to be refined. To achieve this result, it is sufficient to keep the lightning steps in the dedicated rendering pipeline, to determine the colour deviation from the ambient lighting of the scene.

In one preferred alternative, the visibility mark is integrated over a predetermined period of time. This period depends on the nature of the object. The object may for example include text or symbols. The period is then the time sufficient to allow the text or symbols to be read. In another alternative, this period is between 0.5 second and 3 seconds.

In the invention, the dedicated pipeline processes opaque objects first, then transparent objects. In a preferred alternative, the dedicated pipeline is the simplest one provided by the renderer that meets the previous condition. This limits processing resources consumed by the invention.

The invention claimed is:

1. A method for calculating a visibility score within a three-dimensional scene, the scene being comprised of a plurality of objects, the method comprising the following steps implemented by a dedicated camera being a clone of a main camera, the dedicated camera being associated with a dedicated graphics pipeline:

selecting a set of at least one object from the plurality of objects in the scene;

for each object in the set selected, clipping the object into zones to be tested;

selecting a stencil buffer channel to record a visibility mask for the objects in the set selected, the visibility mask being produced by associating a custom shader with the objects in the set selected, said custom shader writing a predetermined value into the stencil buffer channel;

using, via a hook of the dedicated pipeline, contents of the channel of the stencil buffer to affect the image by making it opaque where the stencil buffer value is not the predetermined value and transparent elsewhere;

rendering transparent objects;

for each object in the set selected:

calculating a visibility score based on the alpha values of the centre points of the zones to be tested.

2. The method for calculating a visibility score within a three-dimensional scene according to claim 1, wherein the predetermined value is different from a default value used by the dedicated pipeline.

3. The method for calculating a visibility score within a three-dimensional scene according to claim 1, wherein, for a given renderer, the dedicated pipeline is the least calculation-resource intensive pipeline.

4. The method for calculating a visibility score according to claim 1, wherein a calculation frequency of the dedicated camera is lower than a calculation frequency of the main camera.

5. The method for calculating a visibility score according to claim 1, wherein lighting calculation steps are maintained in the dedicated pipeline to measure a colour deviance from an ambient lighting of the scene, said colour deviance being used to modify the visibility score.

* * * * *